3,409,555
REFRIGERANT COMPOSITION
Bernhardt J. Eiseman, Jr., Wilmington, Del., assignor to E. I. du Pont de Nemours and Company, Wilmington, Del., a corporation of Delaware
No Drawing. Filed Aug. 25, 1965, Ser. No. 482,625
4 Claims. (Cl. 252—67)

ABSTRACT OF THE DISCLOSURE

Substantially constant boiling compositions of trifluoromethyl 2,2,2-trifluoroethyl ether and dichlorofluoromethane useful as high-capacity refrigerants and a refrigeration process employing such compositions.

---

This invention is directed to novel fluorinated compositions useful as refrigerants. More particularly, this invention is directed to novel azeotrope-like compositions of trifluoromethyl 2,2,2-trifluoroethyl ether $$(CF_3OCH_2CF_3)$$

and dichlorofluoromethane ($CHCl_2F$, R–21) for use as high-capacity refrigerant compositions.

The refrigerant capacity of a given amount of refrigerant is largely a function of boiling point, the lower boiling refrigerants generally offering a greater capacity at a given evaporator temperature. This factor to a great extent influences the design of refrigerating equipment and affects capacity, power requirements, size and cost of the unit. Another important factor directly related to boiling point of the refrigerant is minimum cooling temperature obtained in the evaporator during the refrigeration cycle, the lower boiling refrigerants being used to achieve the lower refrigeration temperatures. For these reasons, a large number of refrigerants of different boiling temperature and capacity are required to permit flexibility in design and the art is continuously faced with the problem of providing new refrigerants as the need arises for new capacities and types of installation.

The chlorofluorohydrocarbon refrigerants, particularly chlorofluoro derivatives of methane and ethane, possess properties which have established these compounds as the most commonly used refrigerants. Among the favorable properties possessed by these refrigerants are low toxicity, nonflammability, freedom from odor, and high chemical and thermal stability. However, although these compounds are very attractive refrigerants, they leave room for improvement in one property or another. Sometimes an improvement in properties can be made by admixing a second component with the refrigerant. The added material should not, of course, detract from the good properties of the refrigerant and introduce new problems or disadvantages. It would be undesirable, for example, for a mixture to undergo a fractional separation into its components on evaporation in the evaporator of the cooling unit. The components of a mixture should either have essentially the same boiling temperature or form a constant boiling mixture, i.e., an azeotrope.

It is, therefore, an object of this invention to provide new compositions suitable for use as refrigerants.

It is another object to provide refrigerants possessing increased refrigerant capacity at a given evaporator temperature and increased chemical and thermal stability.

These and other objects will become apparent from the following discussion and claims.

More specifically, the present invention is directed to an azeotrope-like composition consisting of from about 20% to about 98% by weight of trifluoromethyl 2,2,2-trifluoroethyl ether and about 80% to about 2% by weight of dichlorofluoromethane.

The present invention is also directed to an azeotrope of about 67% by weight of trifluoromethyl 2,2,2-trifluoroethyl ether and about 33% by weight of dichlorofluoromethane.

The present invention is further directed to a process for transferring heat in a refrigeration cycle which comprises repeatedly evaporating, compressing, and condensing in a closed system an azeotrope-like mixture of from about 20% to about 98% by weight of trifluoromethyl 2,2,2-trifluoroethyl ether and about 80% to about 2% by weight of dichlorofluoromethane.

The selected fluoroether, $CF_3OCH_2CF_3$, added to dichlorofluoromethane forms a minimum-boiling homogeneous azetrope with improved properties compared to those of dichlorofluoromethane. Dichlorofluoromethane is a chlorofluorohydrocarbon adapted for use in air conditioning, but it is known to swell and attack electrical insulation to a greater extent than desirable. In addition, it is less stable chemically than desired, and decomposition and corrosion can occur at elevated temperatures. It has now been unexpectedly found that the addition of trifluoromethyl 2,2,2-trifluoroethyl ether to dichlorofluoromethane markedly reduces the swelling of insulation with which the refrigerant comes into contact and also provides a refrigerant of increased chemical and thermal stability as compared to dichlorofluoromethane. From about 20% upwards of the fluoroether in the mixture has these advantageous effects. Moreover, due to its lower boiling point, the azeotrope-like compositions of this invention offer a greater capacity at a given evaporator temperature and a lower refrigeration temperature. Moreover, the azeotrope-like compositions do not significantly change their composition on evaporation, hence providing ideal refrigerants. The minimum-boiling, azeotrope-like compositions of this invention are also useful as centrifugal refrigerants. The azeotrope's molecular weight is a decided advantage in this application. The invention mixture of trifluoromethyl 2,2,2-trifluoroethyl ether and dichloromethane is also useful in regulating devices, such as thermal expansion valves.

A concentration of about 67% of the fluoroether in the mixture forms a minimum-boiling, homogeneous azeotrope with a normal boiling temperature of 35° F. (1.7° C.). The trifluoromethyl 2,2,2-trifluoroethyl ether has a normal boiling temperature of 42° F. (5.6° C.), while dichlorofluoromethane boils at 48° F. (8.9° C.) at one atmosphere pressure. Mixtures of trifluoromethyl 2,2,2-trifluoroethyl ether and dichlorofluoromethane containing from about 20% to about 98% of the fluoroether possess a boiling temperature between 35° F. and 40° F. and exhibit the above-noted improvements over dichlorofluoromethane as a refrigerant composition.

Dichlorofluoromethane is commercially available. It is prepared by the treatment of chloroform with anhydrous hydrogen fluoride in the presence of antimony tri- and pentachlorides as described in U.S. Patent 2,005,705.

Trifluoromethyl 2,2,2-trifluoroethyl ether is prepared by those skilled in the art by heating at 100° C. to 150° C. for 8 to 16 hours 2,2,2-trifluoroethanol with a molar excess of carbonyl fluoride to form the trifluoromethyl ester of fluoroformic acid. The reaction mass is then cooled to room temperature and the excess carbonyl fluoride vented. Thereafter, the temperature of the mass is lowered to −80° C. and 1.5 moles of sulfur tetrafluoride added per mole of ethanol. The mass is then heated under autogenous pressure at 150° C. to 200° C. for 8 to 16 hours. The reaction mass is thereafter cooled and the desired products separated by fractional distillation.

It is to be understood that the preceding discussion is representative and that the specific embodiments exemplified may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A substantially constant boiling composition consisting of from about 20% to about 98% by weight of trifluoromethyl 2,2,2-trifluoroethyl ether and about 80% to about 2% by weight of dichlorofluoromethane.

2. An azeotrope consisting of about 67% by weight of trifluoromethyl 2,2,2-trifluoroethyl ether and about 33% by weight of dichlorofluoromethane.

3. A process for refrigeration which comprises in a refrigeration cycle continuously condensing a substantially constant boiling mixture of from about 20% to about 98% by weight of trifluoromethyl 2,2,2-trifluoroethyl ether and about 80% to about 2% by weight of dichlorofluoromethane and thereafter evaporating said mixture in the vicinity of a body to be cooled.

4. A process for refrigeration which comprises in a refrigeration cycle continuously condensing an azeotrope of about 67% by weight of trifluoromethyl 2,2,2-trifluoroethyl ether and about 33% by weight of dichlorofluoromethane.

References Cited

UNITED STATES PATENTS

| | | | |
|---|---|---|---|
| 2,255,584 | 9/1941 | Hubacker | 252—67 X |
| 2,500,388 | 3/1950 | Simons | 252—67 X |
| 3,189,621 | 6/1965 | Harnik | 260—614 X |

HERBERT B. GUYNN, *Primary Examiner.*

S. D. SCHWARTZ, *Assistant Examiner.*